United States Patent
Frisson et al.

(10) Patent No.: US 7,218,581 B2
(45) Date of Patent: May 15, 2007

(54) ASYNCHRONOUS CROSSTALK CANCELLATION

(75) Inventors: Jo Stefan Frisson, Leuven (BE); David Modrie, Leuven (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 149 days.

(21) Appl. No.: 10/539,324

(22) PCT Filed: Dec. 2, 2003

(86) PCT No.: PCT/IB03/05761

§ 371 (c)(1),
(2), (4) Date: Jun. 15, 2005

(87) PCT Pub. No.: WO2004/057598

PCT Pub. Date: Jul. 8, 2004

(65) Prior Publication Data

US 2007/0053261 A1     Mar. 8, 2007

(30) Foreign Application Priority Data

Dec. 20, 2002 (EP) .................................. 02080537

(51) Int. Cl.
  *G11B 7/00* (2006.01)
(52) U.S. Cl. ................ 369/44.32; 369/53.12; 369/53.33

(58) Field of Classification Search .................... None
See application file for complete search history.

(56) References Cited

U.S. PATENT DOCUMENTS

| 5,568,456 A | * | 10/1996 | Hayashi et al. | ......... 369/124.01 |
| 2002/0110059 A1 | * | 8/2002 | Usui et al. | ............... 369/47.28 |

\* cited by examiner

*Primary Examiner*—Muhammad Edun
(74) *Attorney, Agent, or Firm*—Michael E. Belk

(57) ABSTRACT

A device for delivering a data signal at a data rate has crosstalk cancellation. The crosstalk reducing unit (14) has an adaptive filter (15) to generate a crosstalk signal corresponding to a track adjacent to a track being scanned. A subtractor (16) subtracts the crosstalk signal from a read signal. A calculating unit (17) calculates filter coefficients for the adaptive filter. The adaptive filter (15) and subtractor (16) are coupled to an asynchronous clock (18) for operating at an asynchronous sample rate. The crosstalk reducing unit (14) has a sample rate converter (19) coupled to a synchronous clock for converting the output of the subtractor to the data signal (8) at a synchronous sample rate. A timing recovery unit (11) is coupled to the data signal (8) for retrieving the synchronous clock corresponding to the data rate. This has the advantage that the latency introduced by the crosstalk cancellation processing doesn't contribute to the overall delay of the timing recovery loop, while the latter still profits from the crosstalk cancellation.

11 Claims, 6 Drawing Sheets

Figure 1:
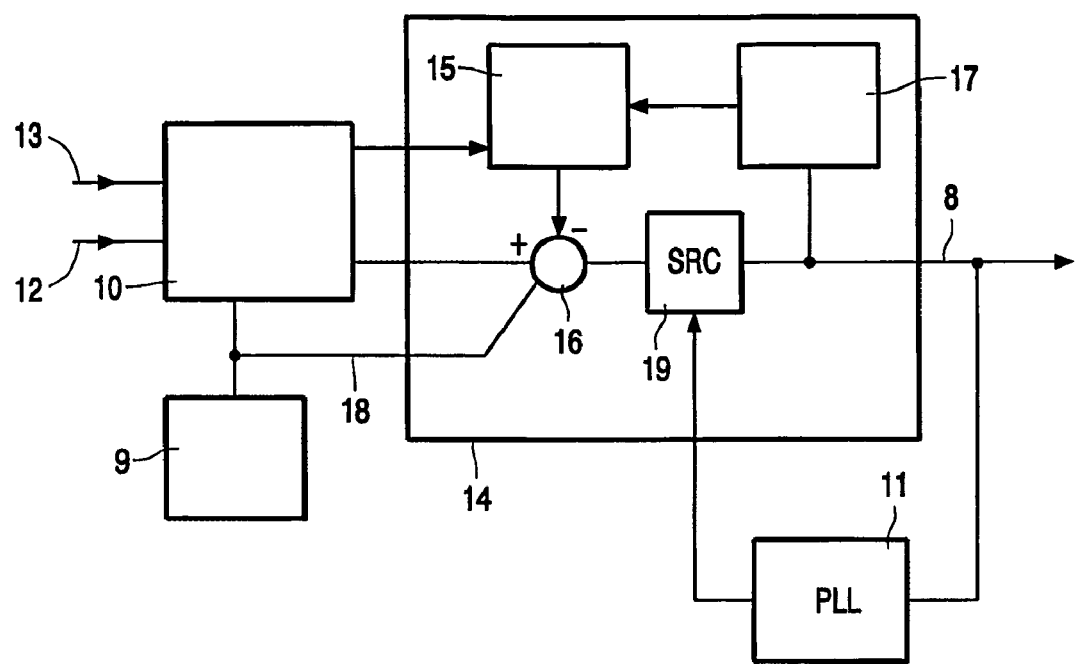

$$f^{+-}((k-4)T_s) = (1-c_{k-4}) \cdot f^{+-}(m_{k-4}T) + c_{k-4} \cdot f^{+-}((m_{k-4}+1)T) = f^{+-}((j-3)T)$$

$$f^{+-}((k-3)T_s) = (1-c_{k-3}) \cdot f^{+-}(m_{k-3}T) + c_{k-3} \cdot f^{+-}((m_{k-3}+1)T) = \frac{f^{+-}((j-3)T)}{4} + \frac{3 \cdot f^{+-}((j-2)T)}{4}$$

$$f^{+-}((k-2)T_s) = (1-c_{k-2}) \cdot f^{+-}(m_{k-2}T) + c_{k-2} \cdot f^{+-}((m_{k-2}+1)T) = \frac{f^{+-}((j-2)T)}{2} + \frac{f^{+-}((j-1)T)}{2}$$

$$f^{+-}((k-1)T_s) = (1-c_{k-1}) \cdot f^{+-}(m_{k-1}T) + c_{k-1} \cdot f^{+-}((m_{k-1}+1)T) = \frac{f^{+-}(jT)}{4} + \frac{3 \cdot f^{+-}((j-1)T)}{4}$$

$$f^{+-}(kT_s) = (1-c_k) \cdot f^{+-}(m_kT) + c_k \cdot f^{+-}((m_k+1)T) = f^{+-}(jT)$$

$$f^{+-}((k+1)T_s) = (1-c_{k+1}) \cdot f^{+-}(m_{k+1}T) + c_{k+1} \cdot f^{+-}((m_{k+1}+1)T) = \frac{f^{+-}(jT)}{4} + \frac{3 \cdot f^{+-}((j+1)T)}{4}$$

$$f^{+-}((k+2)T_s) = (1-c_{k+2}) \cdot f^{+-}(m_{k+2}T) + c_{k+2} \cdot f^{+-}((m_{k+2}+1)T) = \frac{f^{+-}((j+1)T)}{2} + \frac{f^{+-}((j+2)T)}{2}$$

$$f^{+-}((k+3)T_s) = (1-c_{k+3}) \cdot f^{+-}(m_{k+3}T) + c_{k+3} \cdot f^{+-}((m_{k+3}+1)T) = \frac{f^{+-}((j+2)T)}{4} + \frac{3 \cdot f^{+-}((j+3)T)}{4}$$

$$f^{+-}((k+4)T_s) = (1-c_{k+4}) \cdot f^{+-}(m_{k+4}T) + c_{k+4} \cdot f^{+-}((m_{k+4}+1)T) = f^{+-}((j+3)T)$$

FIG.7

ASYNCHRONOUS CROSSTALK CANCELLATION

The invention relates to a device for delivering a data signal at a data rate, the device comprising an input unit for receiving an input signal representing data and at least one auxiliary signal comprising a crosstalk signal also present in the input signal and for generating a read signal, a timing recovery unit for retrieving a synchronous clock corresponding to the data rate, and a crosstalk reducing unit for reducing crosstalk in the data signal, the crosstalk reducing unit comprising an adaptive filter for filtering the auxiliary signal to generate the crosstalk signal, a subtractor for subtracting the crosstalk signal from a read signal from the input unit, and a calculating unit for calculating filter coefficients for the adaptive filter.

The invention is in particular suitable for an input signal corresponding to a track being scanned by a centre spot and an auxiliary signal corresponding to a track adjacent to the track scanned by a satellite spot.

A device for scanning a track and reading information is known from patent U.S. Pat. No. 6,134,211. The device has a head comprising a detector for generating a read signal representing data from marks in a track on a record carrier like an optical disc. It is discussed that the read signal may be degraded due to crosstalk from adjacent tracks, e.g. caused by an angle between the record carrier and the reading head, called skew or tilt. The head comprises a detector for detecting a main signal from a centre spot and additional detectors for detecting auxiliary signals from satellite spots that at least partly cover adjacent tracks. The degradation due to crosstalk is reduced by using the auxiliary signals in a crosstalk removing circuit. The output of the crosstalk removing circuit is a data signal that is coupled to a data detector, e.g. a Viterbi decoder, and to a timing recovery circuit, e.g. a phase locked loop (PLL), for generating a synchronous data clock. The signals from the detectors are converted in an input unit to the digital domain at a sample rate determined by the data clock, and the processing in the crosstalk removing circuit is also performed at the data clock rate in the digital domain, the configuration called a synchronous system. A problem of the known device is that the timing recovery circuit is coupled to the output of the crosstalk removing circuit. This has the effect that delay caused by the crosstalk removing circuit is included in the timing recovery loop. Such delay may cause instabilities when recovering the data clock in adverse circumstances. Hence the amount of processing that can be accommodated in the crosstalk removing circuit is limited.

Therefore it is an object of the invention to provide a device and method for reducing crosstalk which allows sophisticated processing in a crosstalk reducing circuit without deteriorating the timing recovery.

According to a first aspect of the invention the object is achieved with a device as defined in the opening paragraph, characterized in that the adaptive filter and subtractor are coupled to an asynchronous clock for operating at an asynchronous sample rate, and in that the crosstalk reducing unit comprises a sample rate converter coupled to the synchronous clock for converting the output of the subtractor to the data signal at a synchronous sample rate, the timing recovery unit being coupled to the data signal for said retrieving of the synchronous clock. The effect of having a first part of the processing performed at an asynchronous clock is that this part is not affected by the timing recovery process. The timing recovery still has the advantages of being coupled to the data signal, i.e. after crosstalk correction. The arrangement has the advantage that delays in the asynchronous part, e.g. in the adaptive filter, are not included in the timing recovery loop. Hence a sophisticated type of filtering requiring a significant delay can be applied achieving high performance data signal retrieval, while the timing recovery stability is not jeopardized.

In an embodiment of the device the calculating unit is coupled to the synchronous clock for operating at the synchronous sample rate. This has the advantage that the calculation is based on values of the data signal at instants synchronous to the actual data contents in the data signal. Hence the calculated coefficients will be optimized for improving the data contents.

In an embodiment of the device the crosstalk reducing unit comprises inverse conversion means for converting the filter coefficients calculated at the synchronous sample rate for the adaptive filter operating at the asynchronous sample rate. This has the advantage that the coefficients are converted to corresponding values for the asynchronously operating adaptive filter. In a practical embodiment of the device the inverse conversion means comprise latches for allowing re-sampling of the filter coefficients at the asynchronous sample rate. This has the advantage that latches are a low cost inverse conversion suitable for signal values that do not rapidly change. The inventors have seen that the crosstalk mechanism is not rapidly changing and hence the filter coefficients do not rapidly change. In particular this is true for optical disc read-out systems. Practically this means that the adaptation constant is small. In combination with an integrator and an LMS function in the coefficient calculation, which have a low-pass characteristic, this allows the use of latches.

In an embodiment of the device the adaptive filter has sections spaced at a sample period corresponding to the asynchronous sample rate, and the inverse conversion means comprise a spatial interpolator for converting filter coefficients calculated for an adaptive filter having sections spaced at a sample period (T) corresponding to the synchronous sample rate into filter coefficients for the adaptive filter. This has the advantage that spatially interpolated filter coefficients are more accurately corresponding to filter coefficients actually required in the asynchronously operating adaptive filter.

In an embodiment of the device the calculation unit is arranged for calculating the filter coefficients based on the data signal and the auxiliary signal by a least mean square function. This has the advantage that the least mean square function provides a convenient way of calculating filter coefficients for an adaptive filter such as an equalizer and/or a finite impulse response filter.

In an embodiment of the device the crosstalk reducing unit comprises at least one delay unit coupled to a further sample rate converter for generating from the auxiliary signal a delayed synchronized signal as input signal for the calculation unit. This has the advantage that the auxiliary input signal is converted to a synchronized signal providing more accurate calculation of the filter coefficients. In particular the structure is applicable for adaptation methods of the filter coefficients which require a conversion to the bitsynchronous domain. For example a minimum jitter criterion, where the energy on the transition moments is minimized, must be calculated in the bit synchronous domain, because the transition moment can be only measured on the bitsynchronous signal. The overall de-correlation method on the other hand must not be necessarily converted to the bitsynchronous domain.

In an embodiment of the device the calculation unit comprises an integrator unit for integrating filter coefficient correction values calculated according to the least mean square function. The integrator has the effect of closing a control loop for the filter adaptation. This has the advantage that short disturbances will not immediately change the filter coefficients. In particular the integrator is part of an LMS function, which function then has a lowpass characteristic and thus it will filter off small disturbances.

In an embodiment of the device the device comprises means for setting the asynchronous sample rate at a predefined, substantially constant, ratio to the synchronous sample rate. This has the effect that the delay of processing steps in the asynchronous part is known in relation to the data rate. This allows for example memory delay lines, usually FIFOs, to be dimensioned at a known delay. For example in an optical pickup unit having a main spot and satellite spots preceding or following the main spot the delay of an auxiliary signal of a satellite spot with respect to the input signal from the main spot can be compensated by a known delay.

Further preferred embodiments of the device according to the invention are given in the further claims.

Figure 2:
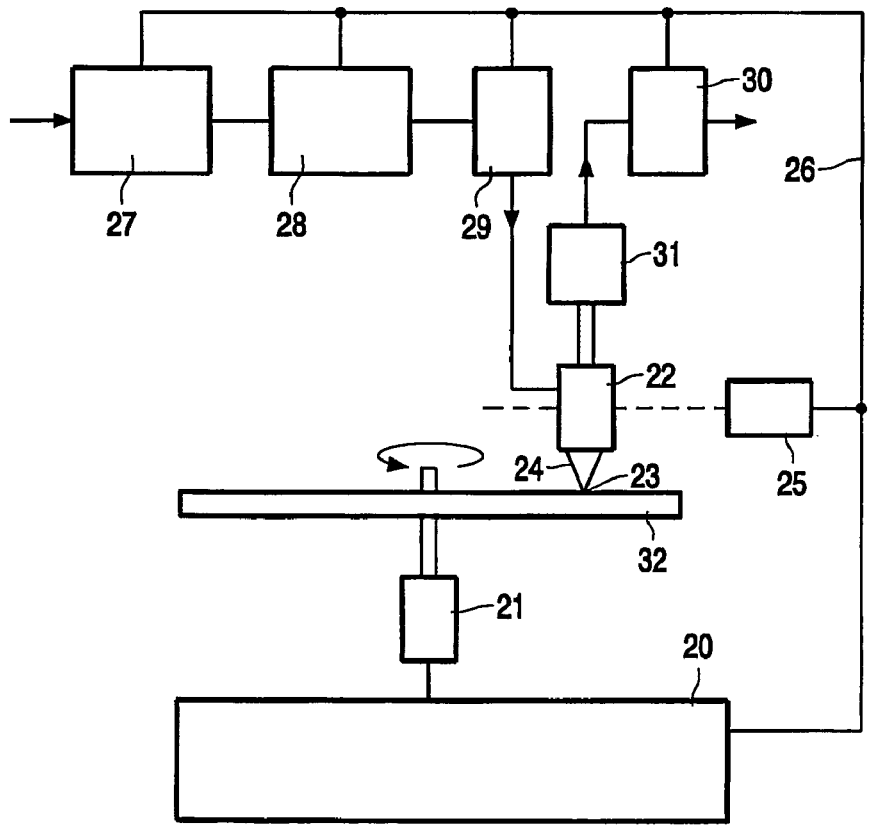
Figure 3:
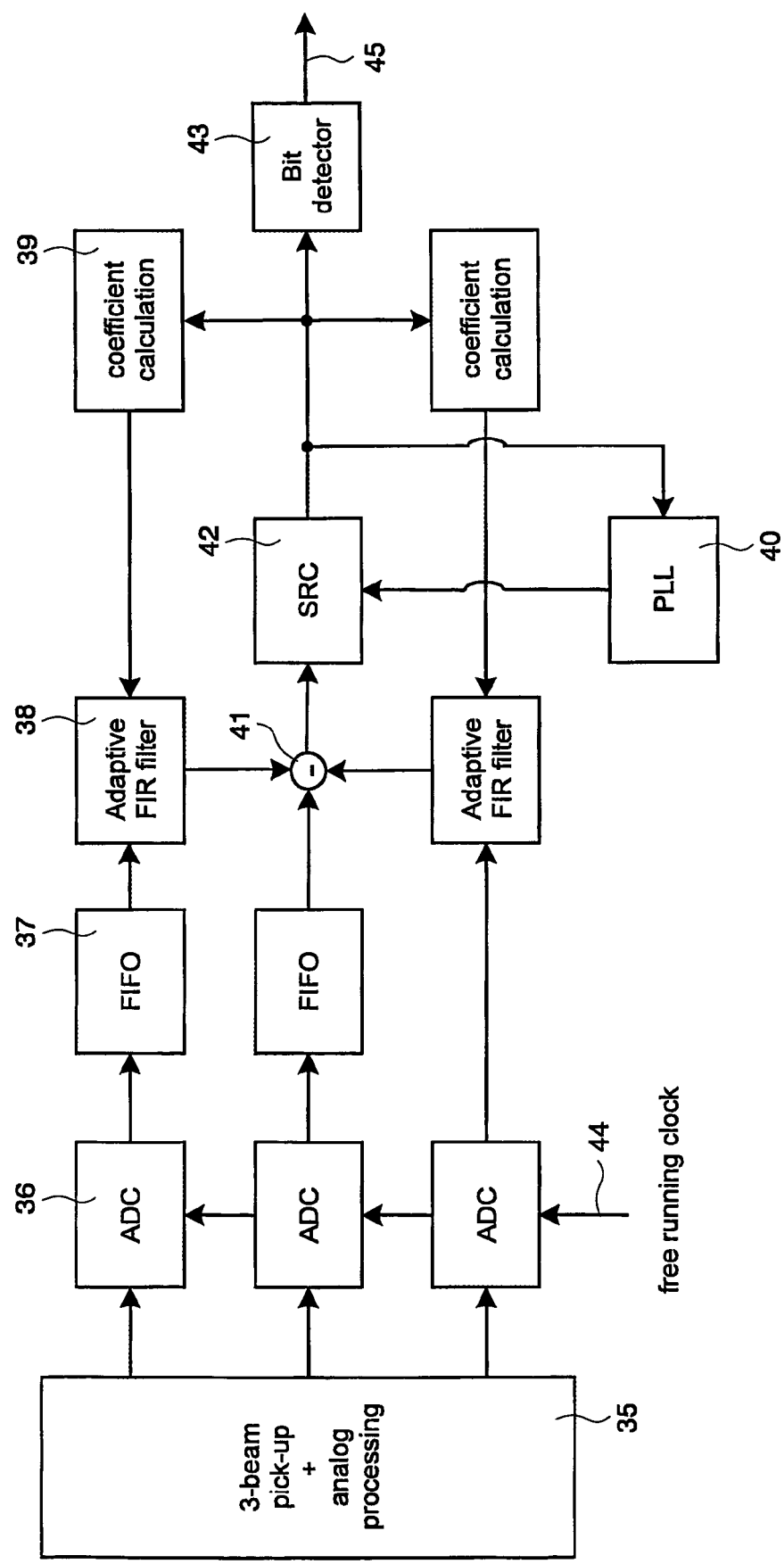
Figure 4:
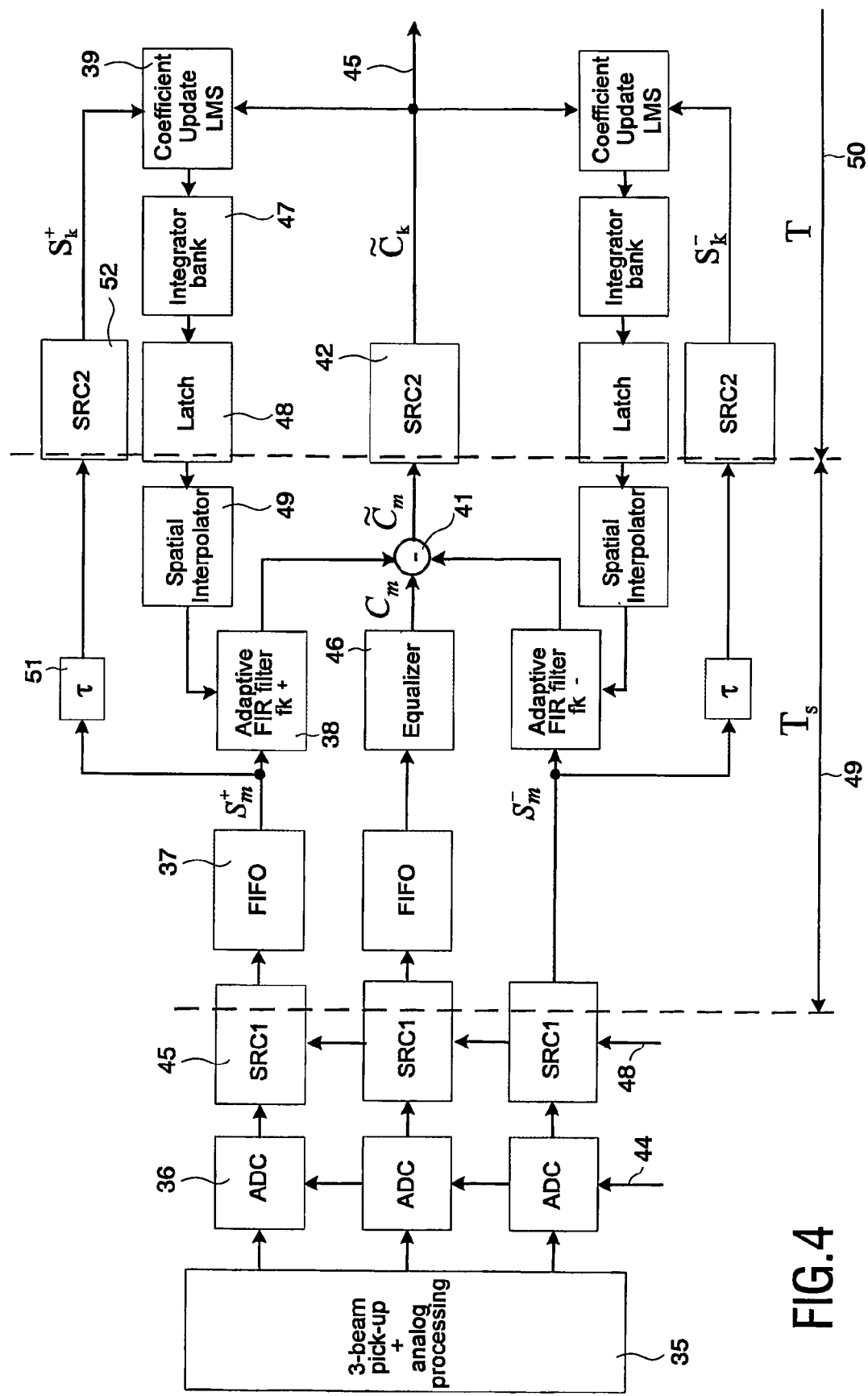
Figure 5:
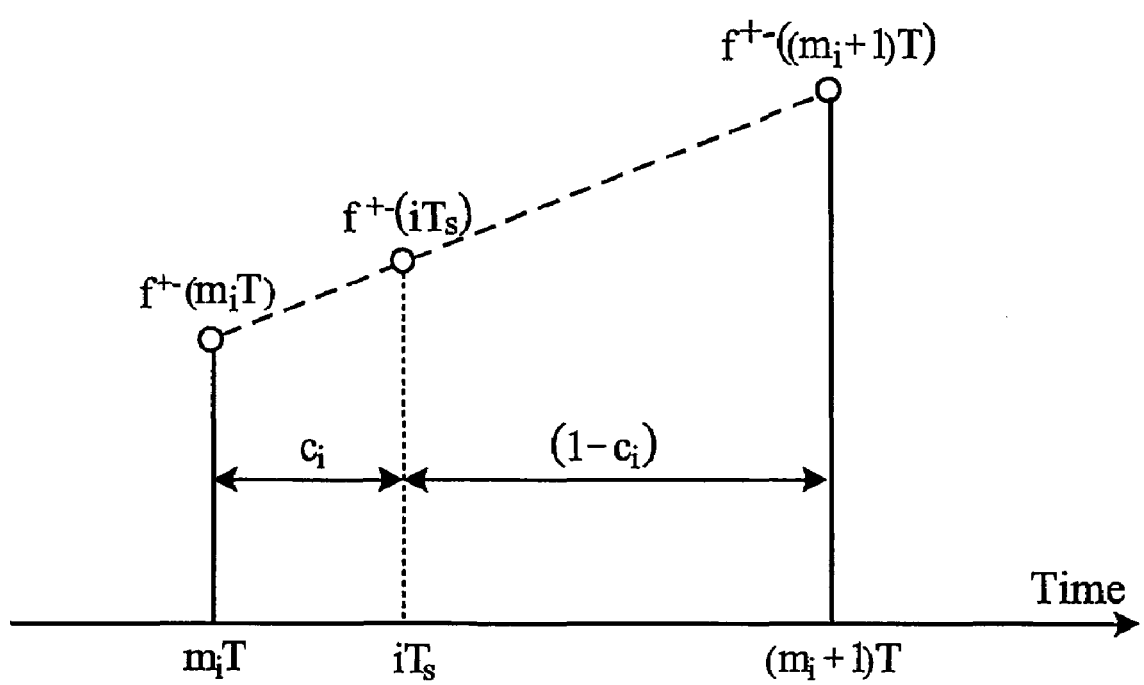
Figure 6:
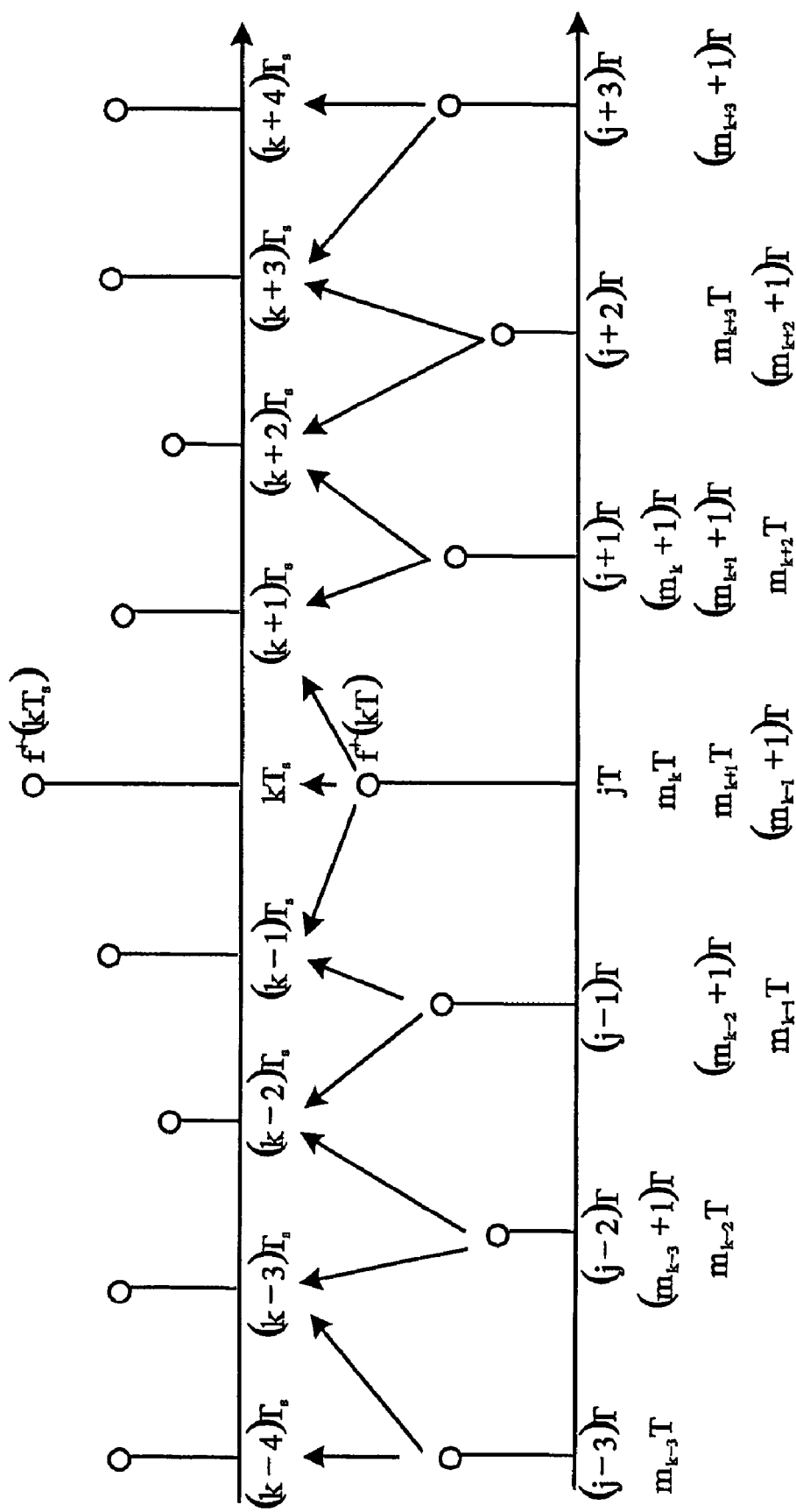

These and other aspects of the invention will be apparent from and elucidated further with reference to the embodiments described by way of example in the following description and with reference to the accompanying drawings, in which FIG. 1 shows a crosstalk reducing system, FIG. 2 shows a scanning device, FIG. 3 shows an asynchronous crosstalk reduction system, FIG. 4 shows an asynchronous crosstalk reduction system in detail, FIG. 5 shows linear interpolation, FIG. 6 shows spatial interpolation, and FIG. 7 shows conversion formulas for spatial interpolation.

In the Figures, elements which correspond to elements already described have the same reference numerals.

FIG. 1 shows a crosstalk reducing device. An input unit 10 has inputs for receiving an input signal 12, generated for example by scanning a track on an optical record carrier, and at least one auxiliary signal 13, containing at least some components of a source of crosstalk like an adjacent track of the record carrier. Further device has a timing recovery unit 11, e.g. a phase locked loop (PLL), for retrieving a synchronous clock corresponding to a data rate (1/T) from a data signal 8. The input unit 10 is coupled to crosstalk reducing unit 14 having the following elements. The input unit 10 provides a read signal to a subtractor 16 for generating a corrected read signal and an auxiliary signal to an adaptive filter 15. The corrected read signal from the subtractor 16 is coupled to a sample rate converter (SRC) 19 to be converted into a data signal at the synchronous clock rate. The adaptive filter 15 is for filtering the auxiliary signal to generate a crosstalk signal corresponding to a track adjacent to the track being scanned. Further the crosstalk reducing unit 14 includes a calculating unit 17 for calculating filter coefficients for the adaptive filter 15. The adaptive filter 15 and subtractor 16 are coupled to an asynchronous clock 18 from a clock generator 9 for operating at an asynchronous sample rate ($1/T_s$). The crosstalk reducing unit 14 further comprises a sample rate converter 19 coupled to the synchronous clock for converting the output of the subtractor 16 to the data signal 8 at a synchronous sample rate. The timing recovery unit 11 is connected to the data signal (8) for said retrieving of the synchronous clock.

FIG. 2 shows a scanning device for scanning information on a record carrier 32. The device is provided with means for scanning the track on the record carrier which means include a drive unit 21 for rotating the record carrier 32, a head 22, a positioning unit 25 for coarsely positioning the head 22 in the radial direction on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. For reading the radiation reflected by the information layer is detected by a detector of a usual type, e.g. a four-quadrant diode, in the head 22 for generating a read signal and further detector signals including a tracking error and a focusing error signal for controlling said tracking and focusing actuators. The signals from the head are connected to a crosstalk reducing device 31 as described above with reference to FIG. 1. further embodiments of the crosstalk reducing device 31 are described below with reference to FIGS. 3 and 4. The crosstalk reducing device 31 produces a data signal that is processed by read processing unit 30 of a usual type including a demodulator, deformatter and output unit to retrieve the information. Hence retrieving means for reading information include the drive unit 21, the head 22, the positioning unit 25 and the read processing unit 30.

The control unit 20 controls the scanning and retrieving of information and may be arranged for receiving commands from a user or from a host computer. The control unit 20 is connected via control lines 26, e.g. a system bus, to the other units in the device. The control unit 20 comprises control circuitry, for example a microprocessor, a program memory and interfaces for performing the procedures and functions as described below. The control unit 20 may also be implemented as a state machine in logic circuits.

In an embodiment the device is provided with means for recording information on a record carrier of a type which is writable or re-writable, for example CD-R or CD-RW, or DVD+RW or BD. The device comprises write processing means for processing the input information to generate a write signal to drive the head 22, which means comprise an input unit 27, and modulator means comprising a formatter 28 and a modulator 29. For writing information the radiation is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material.

Writing and reading of information for recording on optical disks and formatting, error correcting and channel coding rules are well-known in the art, e.g. from the CD or DVD system. In an embodiment the input unit 27 comprises compression means for input signals such as analog audio and/or video, or digital uncompressed audio/video. Suitable compression means are described for video in the MPEG standards, MPEG-1 is defined in ISO/IEC 11172 and MPEG-2 is defined in ISO/IEC 13818. The input signal may alternatively be already encoded according to such standards.

FIG. 3 shows an asynchronous crosstalk reduction system. The system has an input unit for generating input signals, a main input signal (middle position in the Figure) and two auxiliary signals (top and bottom position in the Figure), for example 3 input signals from a center spot and a leading and lagging satellite spot from a 3-beam pick-up and analog front end processing. The input signals are coupled to analog to digital converters (ADC) 36, operating on a free running clock 44. It is noted that the clock 44 can be free running if the output signal of the pick up has a roughly fixed data rate. The clock can be selected in relation to that data rate. Alternatively the clock can be preset at a predefined ratio to the data rate, resulting in a fixed ratio $T/T_s$. The input signals are coupled to a delay memory 37, e.g. of the FIFO type, for delaying the input signals to compensate differences in time, e.g. due to the position of the satellite spots with respect to the main spot. The main input signal is coupled to a subtractor 41. The output of the subtractor 41 is a corrected main signal which is coupled to a sample rate converter (SRC) 42 and after the SRC to a bit detector 43; to generate an output signal 45 available for bit decisions for retrieving the actual digital information. A timing recovery circuit (PLL) 40 is coupled to the corrected main signal for recovering a synchronous clock that is synchronous with the data signal. The converted corrected main signal is further coupled to coefficient calculation units 39 for determining the disturbances in the corrected main signal and calculating filter coefficients thereof as indicated below. The filter coefficients are coupled to adaptive filters 38 (usually FIR type) for the auxiliary signals. The adaptive filters receive the auxiliary signals (after proper delay from the delay memory 37). The output of the adaptive filters 38 represents the correction values coupled to the subtractor 41.

It is to be noted that the latency introduced by the adaptive filters 38 does not contribute to the overall delay of the timing recovery loop and the timing recovery does profit from the crosstalk canceling as it is placed after the adaptive FIR filters. The structure has an increased complexity of the adaptation loop for the FIR filters compared to a fully synchronous circuit. The coefficient calculation must be done in the synchronous domain while the filter updates must be done in the asynchronous domain, necessitating some inverse sample rate conversion. Another advantage of the system is that the processing in the asynchronous domain can be done at a lower speed than the symbol rate, assuming that the bandwidth of the signal is small enough according to the Nyquist criterion.

FIG. 4 shows an asynchronous crosstalk reduction system in detail. The following elements are added compared to FIG. 3. The outputs of the ADC 36 are coupled to first sample rate converters (SRC1) 45 operating on a preset clock 48. In FIG. 3 above alternatives are given using a free running clock or a fixed preset ratio. The system has an asynchronous part $T_s$ indicated by arrow 49 and a synchronous part $T_s$ indicated by arrow 50. The preset clock is chosen such that the $T/T_s$ ratio has fixed value (a few percents of deviation is allowable). In an embodiment the preset clock is determined using wobble information of a recordable type optical disc like DVD+RW. The preset constraint nicely leads to cross talk filters with a fixed time-span, over-sampling independent. The timing recovery, which transfers the signals from the asynchronous $T_s$ domain to the data-rate T domain, can be optimized employing the fixed $T/T_s$ ratio. An equalizer 46 is coupled to the main input signal for equalizing the main input signal to a filtered main signal $C_m$. The satellite signals (after delay) $S_m^+$ and $S_m^-$ are coupled to a delay unit ($\tau$) and a second SRC2 to be converted to signals $S_k^+$ and $S_k^-$ in the synchronous part for entry into the coefficient calculation units 39. The output of the coefficient calculation units 39 is coupled to an integrator bank 47, and then to a latch 48 to transfer the coefficient values back to the asynchronous part. Then the values are processed by a spatial interpolator 49 to adjust the values (calculated for filer taps at T distance) to the filter tap distance $T_s$. The function is as follows. The first sample rate converters (SRC1) transform the incoming satellite signals into digital signals with a sampling rate of $1/T_s$, asynchronous to the data rate. The time delay between the centre track signal and the satellite signals is adjusted with digital memories (FIFO) 37. Because the FIFOs are positioned in the asynchronous domain, the memory length now depends also on the oversampling rate $T/T_s$. The preset clock 48 of SRC1 is chosen such that the $T/T_s$ ratio has a roughly predefined value. The output of the $T_s$ spaced adaptive FIR filters are an estimation of the crosstalk introduced by the neighboring tracks, after the equalization, they are subtracted from the main channel.

$\tilde{C}_m$ Stands for the central track after crosstalk cancellation:

$$\tilde{C}_m = C_m - \sum_k f_k^+ S_{m-k}^+ - \sum_k f_k^- S_{m-k}^-$$

with
  $C_m$: the central spot signal
  $f_k^+$: taps of the upper satellite filter, $f_k^-$: taps of the lower satellite filter
  $S_m^+$: upper satellite signal, $S_m^-$: lower satellite signal
  k: $-M, \ldots, +M$ with $2M+1$ the number of taps of the filter This resulting signal is converted to the synchronous data rate domain using a second sample rate converter (SRC2). In the same manner the input of the FIR filters is first delayed by $\tau$, the delay of the FIR filters from input to output, and then converted to the synchronous domain. In this domain the filter coefficient updates can be easily calculated according to the LMS algorithm. The variables at the output of the integrator bank, denoted $i_{k,n}$, obey the following equation:

$$i_{k+1,n}^+ = i_{k,n}^+ + \Delta_{k,n}^+$$

$$i_{k+1,n}^- = i_{k,n}^- + \Delta_{k,n}^-$$

and $$\Delta_{k,n}^+ = \mu \cdot \tilde{C}_k \cdot S_{k-n}^+$$

$$\Delta_{k,n}^- = \mu \cdot \tilde{C}_k \cdot S_{k-n}^-$$

with
  k: sample number, n: tap number of the FIR filter
  $i_{k,n}$: the output of the n-th integrator at time instant k
  $\Delta_{k,n}$: tap error estimate at iteration step k
  $\mu$: scaling factor In an embodiment these update values are converted back to the asynchronous domain using a bank of inverse sample rate converters. To avoid the complexity of the inverse sample rate converters, one observes that the output of the bank of integrators fluctuates only slowly. As a result this output can be resampled accurately with very simple means for example using a bank of latches 48. This topology is primarily useful for near-synchronous applications (for a T/Ts ratio=1). It is noted that the filter updates are produced in the synchronous data rate domain and are meant for a T spaced equalizer. In reality this filter will have a different tap spacing $T_s$ and the adaptation performance will decrease. In an embodiment this is solved by means of the spatial interpolator 49.

In an embodiment the coefficient calculation is based on a synchronous least mean square (LMS) algorithm as follows. The objective of the LMS algorithm is to adapt the filter such that the mean center track signal power after crosstalk cancellation J is minimized:

$$J(k) = E[\tilde{C}_k^2]$$

The adaptive implementation is based on solving the equation $$\nabla_{\overline{f^{+-}}}(k) = \frac{\partial J(k)}{\partial \overline{f^{+-}}(k)} = \left( \frac{\partial J(k)}{\partial f_0^{+-}(k)}, \ldots, \frac{\partial J(k)}{\partial f_{N-1}^{+-}(k)} \right) \to 0$$

iteratively, using the steepest-descent method:

$$f_n^{+-}(k+1) = f_n^{+-}(k) - \mu \nabla_n^{+-}(k)$$

where $\mu$ is the adaptation constant.
Now is $$\nabla_n^{+-}(k) = \frac{\partial J(k)}{\partial f_n^{+-}(k)} = E\left[ 2 \cdot \tilde{C}_k \cdot \frac{\partial \tilde{C}_k}{\partial f_n^{+-}(k)} \right] = 2 \cdot E[\tilde{C}_k \cdot S_{k-n}^{+-}]$$

From the practical point of view the above mentioned steepest descent update is not computable: the expectation instruction requires an average computation over a very long period. Therefore the gradient is replaced by an instantaneous gradient, which results in the LMS algorithm, called 'the overall de-correlation method':

$$\begin{cases} f_n^+(k+1) = f_n^+(k) - 2 \cdot \mu \cdot \tilde{C}_k \cdot S_{k-n}^+ \\ f_n^-(k+1) = f_n^-(k) - 2 \cdot \mu \cdot \tilde{C}_k \cdot S_{k-n}^- \end{cases}$$

The overall de-correlation method will adapt the filters such that the center track signal power after crosstalk cancellation is minimized. In lieu of the power, one may seek to minimize the average absolute value:

$$\nabla_n^{+-}(k) = \frac{\partial E[|\tilde{C}_k|]}{\partial f_n^{+-}(k)} = E\left[ 2 \cdot \operatorname{sign}(\tilde{C}_k) \cdot \frac{\partial \tilde{C}_k}{\partial f_n^{+-}(k)} \right] = 2 \cdot E[\operatorname{sign}(\tilde{C}_k) \cdot S_{k-n}^{+-}]$$

This results in the sign algorithm:

$$\begin{cases} f_n^+(k+1) = f_n^+(k) - 2 \cdot \mu \cdot \operatorname{sign}(\tilde{C}_k) \cdot S_{k-n}^+ \end{cases}$$

-continued
$$\begin{cases} f_n^-(k+1) = f_n^-(k) - 2 \cdot \mu \cdot \operatorname{sign}(\tilde{C}_k) \cdot S_{k-n}^- \end{cases}$$

This adaptation loop is identical to the previous algorithm, except for the sign operation on $\tilde{C}_k$. The multiplication of $S_{k-s}^{+-}$ by $\operatorname{sign}(\tilde{C}_k)$ involves only sign reversals and is therefore significantly simpler than the classic LMS algorithm. The overall de-correlation method can be employed for the tri-beam set-up with the on-track satellites. However it is unusable in the set-up with the half way satellites, because these satellites contain information on the central track signal causing the overall de-correlation method to cancel out the central track signal. Therefore the energy at transitions is minimized as LMS driving term. This energy is calculated using the linearly interpolated waveform at the transitions between bitsynchronous samples m and m+1:

$$T_m = \frac{\tilde{C}_m + \tilde{C}_{m+1}}{2}$$

Minimizing the mean energy at transitions $$J(k) = E[T_k^2]$$

iteratively, using the steepest-descent method, results in:

$$f_n^{+-}(k+1) = f_n^{+-}(k) - \mu \nabla_n^{+-}(k)$$

Where $\mu$ is the adaptation constant and $$\nabla_n^{+-}(k) = \frac{\partial J(k)}{\partial f_n^{+-}(k)} = E\left[ 2 \cdot T_k \cdot \frac{\partial T_k}{\partial f_n^{+-}(k)} \right] = \cdot E[T_k \cdot (S_{k-n}^{+-} + S_{k-n+1}^{+-})]$$

Replacing the gradient by an instantaneous gradient leads to 'the minimum jitter method':

$$\begin{cases} f_n^+(k+1) = f_n^+(k) - 2 \cdot \mu \cdot T_k \cdot (S_{k-n}^+ + S_{k-n+1}^+) \\ f_n^-(k+1) = f_n^-(k) - 2 \cdot \mu \cdot T_k \cdot (S_{k-n}^- + S_{k-n+1}^-) \end{cases}$$

Also for this method one can think of a sign-algorithm variant:

$$\begin{cases} f_n^+(k+1) = f_n^+(k) - 2 \cdot \mu \cdot \operatorname{sign}(T_k) \cdot (S_{k-n}^+ + S_{k-n+1}^+) \\ f_n^-(k+1) = f_n^-(k) - 2 \cdot \mu \cdot \operatorname{sign}(T_k) \cdot (S_{k-n}^- + S_{k-n+1}^-) \end{cases}$$

In an embodiment the LMS algorithm is adapted for the asynchronous part as follows. The filter coefficient updates can be easily calculated. For the synchronous minimum jitter method as described above:

$$\Delta_{k,n}^+ = 2 \cdot \mu \cdot \operatorname{sign}(T_k) \cdot (S_{k-n}^+ + S_{k-n+1}^+)$$

$$\Delta_{k,n}^- = 2 \cdot \mu \cdot \operatorname{sign}(T_k) \cdot (S_{k-n}^- + S_{k-n+1}^-)$$

It is now possible to convert the updates $\Delta_{k,n}^{+-}$ to the asynchronous domain by means of a bank of inverse SRCs, and to close the control loop via a bank of integrators. As the output of the integrator bank fluctuates slowly, the output is resampled via a bank of latches. This topology is primarily useful for near-synchronous applications (for a T/Ts ratio=1). It is noted that when $T_s$ deviates too much from T, an additional issue is raised, which requires an additional functionality, called spatial interpolation.

This interpolator will convert the initially T-spaced sequence generated within the control loop into an equivalent Ts-spaced sequence for controlling the equalizer coefficient vector. One of the simplest forms of interpolation is linear interpolation, which is attractive from a computational point of view, but other forms of interpolation can be considered such as e.g. nearest-neighbor interpolation, which is even simpler.

In an embodiment for other ratios a spatial interpolator for the LMS based asynchronous crosstalk canceller is applied as follows. For example in an optical receiver, the relation T/Ts amounts 4/3. Conceptually the calculated T-spaced filter updates need to be converted to the 3/4 T domain necessitating an interpolation. The interpolator is in fact a linear interpolation, which is very attractive from a computational point of view. The re-sampling positions $t_i = iT_s$ can be written as $t_i = (m_i + c_i)T$, where $0 \leq c_1 < 1$ and $$m_i = \text{floor}\left(i\frac{T_s}{T}\right)$$

$$c_i = i\frac{T_s}{T} - m_i$$

As $c_i$ varies between 0 and 1, $t_i$ varies between $m_iT$ and $(m_i+1)T$, and $f^{+-}$ varies between $f^{+-}(m_iT)$ and $f^{+-}((m_i+1)T)$.

FIG. 5 shows linear interpolation. Time is indicated on the horizontal axis. A first value $f^{+-}(m_iT)$ and a second value $f^{+-}((mi+1)T)$ are given. The linear interpolation at $iT_s$ is given as $$f^{+-}(iT_s) = (1-c_i) \cdot f^{+-}(m_iT) + c_i \cdot f^{+-}((mi+1)T).$$

Employing the $T/T_s$ ratio of 4/3 leads to the conversion formulas of FIGS. 6 and 7. For other oversampling ratios the formulas can be derived correspondingly. In a practical embodiment, where the asynchronous domain is 4/3 oversampled, the interpolator improves insignificantly the filter's adaptation loop and therefore may be left out.

FIG. 6 shows spatial interpolation. Time is indicated on the horizontal axis. An upper row of filter tap values is derived from a lower row of filter tap values indicated by arrows and according to formulas given in FIG. 7.

FIG. 7 shows conversion formulas for spatial interpolation. Filter tap values $f^{--}(kT_s)$ spaced in the asynchronous domain are derived from a filter tap values spaced $f^{--}(m_kT)$ in the synchronous domain.

Although the invention has been mainly explained by embodiments using optical discs, the invention is also suitable for other record carriers such as rectangular optical cards, magnetic discs or any other type of information storage system that requires crosstalk correction based on auxiliary signals from adjacent tracks. It is noted, that the scheme can also be used for crosstalk cancellation in other systems that produce several parallel signals that contain specific components indicative of crosstalk. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

The invention claimed is:

1. Device for delivering a data signal at a data rate, the device comprising
an input unit for receiving an input signal representing data and at least one auxiliary signal comprising a crosstalk signal also present in the input signal and for generating a read signal, in particular the input signal corresponding to a track being scanned by a centre spot and the auxiliary signal corresponding to a track adjacent to the track scanned by a satellite spot,
a timing recovery unit for retrieving a synchronous clock corresponding to the data rate, and
a crosstalk reducing unit for reducing crosstalk in the data signal, the crosstalk reducing unit comprising
an adaptive filter for filtering the auxiliary signal to generate the crosstalk signal,
a subtractor for subtracting the crosstalk signal from a read signal from the input unit, and
a calculating unit for calculating filter coefficients for the adaptive filter,
characterized in that the adaptive filter and subtractor are coupled to an asynchronous clock for operating at an asynchronous sample rate, and in that the crosstalk reducing unit comprises a sample rate converter coupled to the synchronous clock for converting the output of the subtractor to the data signal at a synchronous sample rate, the timing recovery unit being coupled to the data signal for said retrieving of the synchronous clock.

2. Device as claimed in claim 1, wherein the calculating unit is coupled to the synchronous clock for operating at the synchronous sample rate.

3. Device as claimed in claim 2, wherein the crosstalk reducing unit comprises inverse conversion means for converting the filter coefficients calculated at the synchronous sample rate for the adaptive filter operating at the asynchronous sample rate.

4. Device as claimed in claim 3, wherein the inverse conversion means comprise latches for allowing re-sampling of the filter coefficients at the asynchronous sample rate.

5. Device as claimed in claim 3, wherein the adaptive filter has sections spaced at a sample period corresponding to the asynchronous sample rate, and the inverse conversion means comprise a spatial interpolator for converting filter coefficients calculated for an adaptive filter having sections spaced at a sample period corresponding to the synchronous sample rate into filter coefficients for the adaptive filter.

6. Device as claimed in claim 1, wherein the calculation unit is arranged for calculating the filter coefficients based on the data signal and the auxiliary signal by a least mean square function.

7. Device as claimed in claim 6, wherein the crosstalk reducing unit comprises at least one delay unit coupled to a further sample rate converter for generating from the auxiliary signal a delayed synchronized signal as input signal for the calculation unit.

8. Device as claimed in claim 6, wherein the calculation unit comprises an integrator unit for integrating filter coefficient correction values calculated according to the least mean square function.

9. Device as claimed in claim 1, wherein the device comprises means for setting the asynchronous sample rate at a predefined, substantially constant, ratio to the synchronous sample rate.

10. Device as claimed in claim 1, wherein the input unit comprises means for converting an input signal to the read signal sampled at the asynchronous sample rate, in particular the input unit comprising at least one analog to digital conversion unit operating at a free running clock coupled to a sample rate converter for converting the sampled input signal to the read signal sampled at the asynchronous sample rate.

11. Device as claimed in claim 1, wherein the device is for scanning a track on a record carrier, the track comprising marks representing information, and the device comprises a head for scanning the track and generating the input signal and the auxiliary signal, and a read unit for retrieving the information from the data signal.

* * * * *